(12) United States Patent
Horton

(10) Patent No.: US 7,081,438 B2
(45) Date of Patent: Jul. 25, 2006

(54) DRILLING FLUIDS, DRILLING FLUIDS ADDITIVES AND METHODS USEFUL FOR LIMITING TAR SANDS ACCRETION ON METAL SURFACES

(75) Inventor: David P. Horton, Calgary (CA)

(73) Assignee: Brine -Add Fluids Ltd., Calgary (CA)

( * ) Notice: Subject to any disclaimer, the term of this patent is extended or adjusted under 35 U.S.C. 154(b) by 206 days.

(21) Appl. No.: 10/604,733

(22) Filed: Aug. 13, 2003

(65) Prior Publication Data

US 2005/0037930 A1    Feb. 17, 2005

(51) Int. Cl.
*C09K 8/52* (2006.01)

(52) U.S. Cl. ............ 507/128; 166/304; 166/311; 166/312

(58) Field of Classification Search ............ 507/128; 166/304, 311–312
See application file for complete search history.

(56) References Cited

U.S. PATENT DOCUMENTS

| | | | |
|---|---|---|---|
| 3,065,172 A * | 11/1962 | Groves et al. ............ 507/259 |
| 3,339,634 A | 9/1967 | Meter, Jr. et al. ......... 166/261 |
| 3,613,788 A * | 10/1971 | Kautsky ................... 166/279 |
| 3,880,764 A * | 4/1975 | Donham .................... 507/119 |
| 3,971,734 A | 7/1976 | Bush |
| 4,066,398 A * | 1/1978 | Hwa ........................ 422/15 |
| 4,566,976 A * | 1/1986 | House et al. ............. 507/114 |
| 5,340,397 A * | 8/1994 | Brothers ................... 106/727 |
| 5,346,012 A | 9/1994 | Heathman et al. |
| 5,780,407 A | 7/1998 | Van Slyke |
| 5,788,781 A | 8/1998 | Van Slyke |
| 5,858,928 A | 1/1999 | Aubert et al. |
| 5,964,692 A | 10/1999 | Blezard et al. |
| 6,080,700 A * | 6/2000 | Schapira et al. .......... 504/127 |
| 6,569,814 B1* | 5/2003 | Brady et al. ............. 507/201 |
| 6,803,346 B1* | 10/2004 | Bailey et al. ............. 507/128 |
| 2003/0150613 A1* | 8/2003 | Freiter .................... 166/279 |
| 2004/0238451 A1* | 12/2004 | Marin ..................... 210/699 |

FOREIGN PATENT DOCUMENTS

WO    WO-99/42539 A *    8/1999

* cited by examiner

*Primary Examiner*—Philip C. Tucker
(74) *Attorney, Agent, or Firm*—Bennett Jones LLP

(57) ABSTRACT

Fluids useful in oil well drilling operations are described. The fluids comprise standard viscosifying and fluid loss control additives along with phosphonates or phosphate esters of organic ligands. The addition of the phosphonates or phosphate esters at effective concentrations prevents the adherence of heavy oil and heavy oil laden drill cuttings to drill pipe strings and well bore casings.

26 Claims, 2 Drawing Sheets

DRILLING FLUIDS, DRILLING FLUIDS ADDITIVES AND METHODS USEFUL FOR LIMITING TAR SANDS ACCRETION ON METAL SURFACES

BACKGROUND OF INVENTION

The invention relates to drilling fluids, drilling fluid additives and methods and, in particular, to drilling fluids, drilling fluid additives and methods useful for drilling oil wells through formations containing heavy oil or bitumen and useful for limiting or preventing tar sands accretion on metal surfaces.

Desirable properties of drilling fluids are well known and well documented in references e.g. "*Composition and Properties or Drilling and Completion Fluids, 5th Edition*" H. C. H. Darley et. al, Gulf Publishing Co. 1988. One of the desirable properties of a drilling fluid is to impart lubricity. Lubricity enables contact between the drill string and the earthen formation being bored or the drill string and steel well bore casings that have been inserted in the well bore without imparting undue or unmanageable torque increases due to frictional drag between the drill string and the surface it contacts. Commercially available lubricity additives are designed to provide lubricity between steel drill strings and consolidated earthen formations or steel drill string and steel well bore casings.

In horizontal drilling operations, the drill string first bores a vertical well, then at some predetermined point deviates from vertical in the build section. Eventually the borehole can deviate 90° from vertical to become a horizontal well. The horizontal section of a well is designed to have increase well bore intersection with the oil-bearing formation. The drill string in a horizontal section of the well experiences increased torque due to the increased contact between the string and the horizontal well bore. Horizontal wells are advantageous in heavy oil or bitumen production due to the low mobility of the oil. Horizontal wells offer inherent advantages over vertical wells in steam-assisted oil production. A significant portion of heavy oil deposits are found in unconsolidated formations, such as unconsolidated sand. The mixture of heavy oil or bitumen with this unconsolidated sand, often referred to as tar sands, makes the drill cuttings from these formations malleable. Deformation of these drill cuttings between the drill string and the formation or the drill string and the build section results in the adherence of a coating of the bitumen and sand on the drill string and casing. This coating is often referred to as accretion.

The accretion of the drill cuttings to the drill string and the casing impairs drilling operations by increasing the drag on the drill sting. The entire string can become stuck as a result of the increased drag resulting in excessive operational costs to drill the hole. Further, due to the unconsolidated nature of heavy oil/bitumen formation it is usually necessary to line the horizontal well bore by placing a slotted steel liner throughout the horizontal section. The slotted steel liner allows for oil production while at the same time limiting the amount of sand coproduced and maintaining the horizontal well bore integrity. The slotted steel liner is essentially a steel pipe with a typical wall thickness of 12 mm and a diameter close to that of the well bore. In order for the pipe to be placed in the horizontal section it must be pushed through the curved build section which will have a steel bore hole casing. If the intermediate casing is coated with the drill cutting accretions significant frictional resistance to landing the liner can be encountered to the point where some wells have had to be abandoned due to the slotted liner becoming immovable.

Treatments have been attempted in field operations to remedy these problems including additions of surfactants to emulsify the bitumen or prevent accretion, additions of inorganic salts to prevent accretion, additions of cleaning agents based on naturally occurring hydrocarbons such as d'limonene and additions of conventional lubricants. None of these treatments has satisfactorily prevented the aforementioned operational difficulties. Further, these additives are undesirable from an environmental point of view. Surfactants employed to emulsify the tar sand such as nonyl phenol ethoxylates are toxic to Microtox bacteria. In many instances the inclusion of hydrocarbons such as d'limonene is also undesirable and can present disposal problems with the aqueous based drilling mud. It can be seen then that an additive which would prevent accretion of the bitumen to metal surfaces in drilling these tar sands would be desirable and beneficial.

SUMMARY OF INVENTION

The present invention provides a family of chemicals useful to limit tar sand accretions on metal surfaces. In this application, the term limit has been used to mean, in its broadest sense a reduction over non-additive containing fluids. However, the additive of the present invention can also prevent and/or remove accretions already deposited. The chemical family that is useful in limiting the accretions includes phosphonates and phosphate esters of alkanolamines. Aqueous drilling fluids containing effective concentrations of the phosphonate and/or phosphate ester show a resistance to the accretion of tar sands on metal surfaces.

Thus, in accordance with a broad aspect of the present invention, there is provided a tar sand anti-accretion additive for drilling fluids to limit accretion of tar sands on metal surfaces comprising: at least one of (i) a phosphonate and (ii) a phosphate ester of alkanolamine.

In accordance with another broad aspect of the present invention, there is provided an aqueous-based drilling fluid comprising at least one of (i) a phosphonate and (ii) a phosphate ester of alkanolamine in an amount effective to reduce tar sand accretion.

In accordance with another broad aspect of the present invention, there is provided an aqueous-based drilling fluid comprising an effective amount of a tar sand anti-accretion additive for drilling fluids selected from the group consisting of a phosphonate, a phosphate ester of alkanolamine or mixtures thereof.

In accordance with another broad aspect of the present invention, there is provided a method for drilling a wellbore through a tar sand-containing formation, the method comprising: operating a drilling assembly to drill a wellbore and circulating an aqueous-based drilling fluid through the wellbore as it is drilled, the aqueous-based drilling fluid including an amount of at least one of (i) a phosphonate and (ii) a phosphate ester of alkanolamine effective to limit tar sand accretion on metal surfaces.

In accordance with another broad aspect of the present invention, there is provided a method for limiting accretion on metal surfaces in contact with tar sand-containing formation, the method comprising: washing the metal surfaces with an aqueous-based drilling fluid, the based-based drilling fluid including an amount of at least one of (i) a phosphonate and (ii) a phosphate ester of alkanolamine.

In accordance with another broad aspect of the present invention, there is provided a method for removing accretion from metal surfaces in contact with tar sand-containing formation, the method comprising: washing the metal surfaces with an aqueous-based drilling fluid, the aqueous-based drilling fluid including an amount of at least one of (i) a phosphonate and (ii) a phosphate ester of alkanolamine.

DETAILED DESCRIPTION

Figure 1:
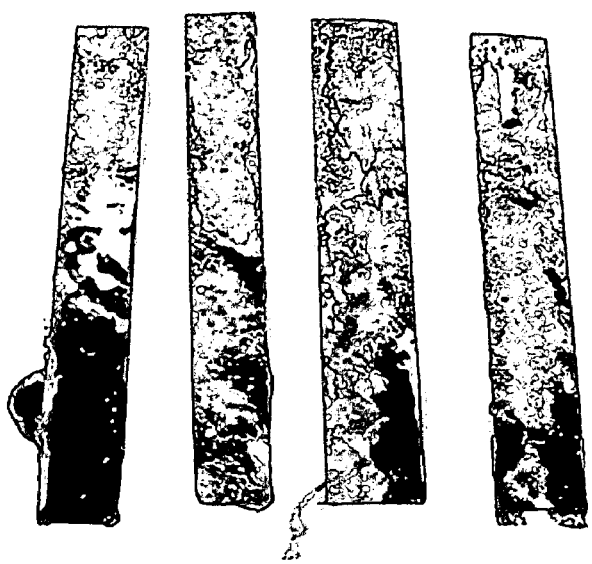
FIGS. 1 to 4 are photos showing the results of tests for tar sand accretion on metal surfaces.

The phosphonates or phosphate esters useful in the present invention comprise an effective additive when applied in aqueous systems that prevent tar sand accretion on metal surfaces exposed to tar sand-containing formations. Preferably, the phosphonates or phosphate esters which are typically acidic are added in their neutralized form or are neutralized after addition to the system. The additive is typically neutralized to a pH range of 7–10.

The tar sand anti-accretion additives according to the present invention are selected from phosphonates, phosphate esters of organic ligands and preferably of alkanolamines or mixtures thereof. Examples of suitable phosphonates include: amino(trimethylenephosphonic) acid (ATMP), 1-hydroxyethylidenediphosphonic acid (HEDP), ethylenediaminetetra(methylenephosphonic) acid (EDTMPA), diethylenetriaminepenta(methylenephosphonic) acid (DTPMPA) and bis(hexamethylenetriamine(pentamethylenephosphonic)) acid (BHMTPMPA) or mixtures thereof.

Examples of suitable phosphate esters include: mono and di-phosphate esters of triethanolamine (TEAPE), mono and di-phosphate esters of diethanolamine (DEAPE) and mono and di-phosphate esters of monoethanolamine (MEAPE) or mixtures thereof.

The phosphonates or phosphate esters of the present invention can be employed at any concentration that is effective to inhibit tar sand accretion on metal surfaces. While lower concentrations may be effective, the additive is generally employed at concentrations of at least 0.1% by weight of the drilling fluid. With economical considerations, based on present price conditions, an upper limit of 5.0% by weight of the drilling fluid has been employed. However, concentrations above 5.0% can be employed if desired.

Aqueous based drilling fluids, according to the present invention, include effective amounts of a phosphonate, a phosphate ester of alkanolamine or mixtures thereof. While lower concentrations may be effective, the additive is generally employed at concentrations of at least 0.1% by weight of the drilling fluid. Preferably, the phosphonates or phosphate esters are added in their neutralized form or are neutralized after addition to the drilling mud. The materials are typically neutralized to a pH range of 7–10. The drilling mud, of course, includes water and additives such as, for example, viscosifying and fluid loss control additives, along with a tar sand anti-accretion additive according to the present invention.

The drilling fluid is useful to inhibit or remove tar sand accretion on metal surfaces. In one aspect the drilling fluid can be used in a method for drilling a wellbore through a tar sand-containing formation. In such a method, without the present additive, drill cuttings can adhere as accretions to the metal surfaces of the drilling assembly, and metal surfaces in the wellbore such as liners and casing. Thus, the present method includes circulating the aqueous-based drilling fluid, as described above, while operating a drilling assembly to drill the wellbore.

It will be appreciated, that it may not be necessary to use the tar sand anti-accretion additive-containing drilling mud throughout an entire drilling operation. For example, it may not be required during drilling through over burden. The method is useful during drilling wherein tar sand drill cuttings are being produced and very useful where there is more frequent contact between metal surfaces such as, for example, during drilling of the build section and the horizontal section of a wellbore.

Where, during drilling using a drilling fluid according to the present invention, accretions are being deposited to an undesirable extent, the concentration of additive can be increased to inhibit further undesirable amounts of accretion and possibly to remove, at least to some degree, those accretions already deposited.

It has been found that the drilling fluid of the present invention can also be used to reduce or remove accretions, which have already been built up on metal surfaces. Thus, in another aspect the drilling fluid can be used in a method for removing accretion from metal surfaces that have been in contact with tar sand-containing formation cuttings, the method comprising: washing the metal surfaces with an aqueous-based chilling fluid, the aqueous-based drilling fluid including an amount of at least one of (i) a phosphonate and (ii) a phosphate ester of alkanolamine.

In this method, the drilling fluid can be used, for example, to wash accretions from the drilling assembly such as the drill string, from the wellbore liners and casing. This method can also be used to facilitate running in of liners, such as a slotted liner into a wellbore where accretions have occurred. The removal of accretions may require washing over a period of time to remove a desired amount of the accretions.

EXAMPLES

The following examples are presented to illustrate but not limit the scope of this invention. All percentages and parts are by weight unless otherwise noted.

The examples were based on the following test procedure, which was developed to replicate accretion of the tar sand onto metal surfaces. In the test procedure, 350 mL of the drilling mud to be tested was added to a Waring commercial blender. The mixer was set to high speed and whilst mixing, tar sand including approximately 10% wt/wt heavy oil and 90% wt/wt sand was added to the drilling mud. If an anti accretion additive was to be added, it was added to the blender at the desired concentration. The resultant drilling mud and tar sand slurry was then mixed for a further 5 minutes to disperse the tar sand and ensure homogeneity.

The prepared drilling mud/tar sand mixture was then transferred into a 500 mL 316 stainless steel drilling mud aging cell such as those supplied by Fann Instruments, having an internal diameter of 2.5" and a depth of 6.25". To simulate steel casing, preweighed mild steel sleeves were inserted into the aging cell with an external diameter of 6.25 inches and a depth of 6". To simulate the drill string, steel coupons of 6"× approximately ½"×0.006" were inserted into the cell. The cell was sealed and placed horizontally in an aging cell roller oven similar to a Fann Instruments Model 701 Roller Oven preheated to 350 C. The rotary apparatus was turned on to rotate the cell at approximately 19 rpm. After the desired aging time had elapsed, the aging cells were removed from the roller oven, the steel sleeves of the steel coupons were removed from the aging cells, rinsed under cold water to remove any loose material on the steel, then rinsed with methanol to remove water. The sleeves were left to dry and then reweighed. The heavy oil or bitumen adhesion was then calculated on a mass quantity per unit of exposed surface area.

Example 1

A sample of drilling fluid was prepared using 350 mL of water containing 0.5% polyanionic cellulose, and 0.3% of a slurried polysaccharide. A slurry was prepared using this fluid and 75 g of tar sand as described in the test procedure. Four steel coupons as described in the test procedure were placed into an aging cell with the slurry and placed in a roller oven for 96 hours. The coupons were removed and treated as described in the test procedure. Tar sand accretions were evident on the coupons as shown in FIG. 1. The tar sand accretion was found to be 102 g tar sand/m$^2$ steel. This example demonstrates the accretion of tar sand on simulated drill string when the drilling fluid is not treated with an anti-accretion additive.

Example 2

Two samples of drilling fluids were prepared using 350 mL of water containing 0.6% of a liquid suspension of a polysaccharide viscosifier, 1% of a starch-based fluid loss control additive and 0.6% of an amine-based clay stabilizer. A slurry was made with this fluid and 75 g of tar sand as described in the test procedure. Steel sleeves as described in the test procedure were placed into each of two aging cells with the corresponding slurry then placed in a roller oven for 24 and 108 hours. The sleeves were removed and treated as described in the test procedure. Tar sand accretions were evident on both the 24 hour and 108 hour aging tests. The tar sand accretion was calculated and found to be 121 g tar sand/m$^2$ steel for the 24 hour aging and 163.8 g tar sand/m$^2$ for the 108 hour aging. This example demonstrates the accretion of tar sand on simulated hole casing material when the drilling fluid is not treated with anti-accretion additives.

Example 3

Figure 2:

Consultants in the field report the usage of an aqueous starch and xanthan based drilling fluid treated with a citrus oil based cleaner to prevent accretion of heavy oil or bitumen on steel surfaces. To test the efficacy of this type of system, a sample of drilling fluid was prepared using 350 mL of water containing 0.2% xanthan gum, 0.8% of a starch based fluid loss control additive and 10.3% of a d'limonene based cleaning agent. The cleaning agent consisted of equal parts of d'limonene, a 9 mole ethoxylate of nonyl phenol and ethylene glycol monobutyl ether. A slurry was prepared using 100 g of tar sand as described in the test procedure. A steel sleeve, as described, was placed into the aging cell with the slurry and then placed in a roller oven for 60 hours. The sleeve was removed and treated as described in the test procedure. Tar sand accretion was evident over the entire sleeve. FIG. 2 is a picture of the sleeve laid open. The tar sand accretion was calculated and found to be 241 g tar sand/m$^2$ steel. This example demonstrates the current art is ineffective in preventing tar sand accretion.

Example 4

Four 350 mL samples of drilling fluid, as described in example 2, were prepared. To each of the resultant fluids, 1.2% of TEAPE was added and the pH of the slurry adjusted to 7 with sodium hydroxide. A slurry with 75 g of tar sand was prepared, as described in the test procedure, for each of the four fluids. Steel sleeves were placed into each of four aging cells with the slurries described above. The cells were then placed in a roller oven for 24, 48, 72 and 96 hours, respectively. The sleeves were removed and treated as described in the test procedure. The tar sand accretion on the sleeves is summarized in Table 1.

TABLE 1

| Tar sand accretion on steel sleeves with anti accretion additive | |
|---|---|
| Aging Time (hours) | Bitumen Accretion (g/m$^2$) |
| 24 | 4.26 |
| 48 | 3.31 |
| 72 | 0 |
| 96 | 0 |

Unlike the sleeves from the previous examples, steel sleeves treated with the phosphate ester had little or no tar sand adhering to them. This example demonstrates that the phosphate ester of this example is effective in inhibiting bitumen accretion over extended periods of time.

Example 5

Figure 3:
Figure 4:

Two drilling fluids were prepared using 350 mL each of water based drilling fluid containing 0.6% of a liquid suspension of a polysaccharide viscosifier, 1% of a starch based fluid loss control additive and 0.6% of an amine based clay stabilizer. To one of the fluids 1.2% of TEAPE was added and neutralized to a pH of 7 while the second fluid was not treated. Slurries described in the test procedure were made using 100 g of tar sand to each of drilling fluids. Steel sleeves were placed into each of two aging cells, the slurry with the additive placed in a first cell and the untreated slurry placed in the second. Thereafter, both aging cells were placed in the roller oven for 60 hours. The sleeves were removed and treated as described in the test procedure. Tar sand accretion for the untreated drilling mud system was 211 g/m$^2$ while the treated system had 0 g/m$^2$ tar sand accretion. The sleeves were laid open. The sleeve from the untreated system is shown in FIG. 3 while the sleeve for the treated system is shown in FIG. 4.

Example 6

To test the efficacy of other organic phosphate acids, 350 mL samples of drilling fluid were prepared using 0.6% of a liquid suspension of a polysaccharide viscosifier, 1% of a starch based fluid loss control additive and 0.6% of an amine-based clay stabilizer. To each of the drilling fluids, various phosphonates were added at various concentrations and the pH adjusted to 7 with sodium hydroxide. Slurries were prepared, as described in the test procedure, using 100 g of tar sand in each of the drilling fluids. Steel sleeves as were placed into aging cells, the slurry transferred into the aging cell and the samples placed in the roller oven for 60 hours. The steel sleeves were then removed and treated as described in the test procedure. Table 2 summarizes the tar sand accretion on the steel sleeves treated with the phosphonates.

TABLE 2

| Phosphonate | Concentration (% of drilling fluid) | Tar Sand Accretion (g/m$^2$) |
|---|---|---|
| ATMP | 2.9% | 1.3 |
| HEDP | 3.5% | 0.99 |
| EDTMPA | 3.6% | 0 |

Example 7

To test the efficacy of the anti accretion additives at various concentrations, 350 mL samples of drilling fluid were prepared using 0.6% of a liquid suspension of a polysaccharide viscosifier and 1% of a starch based fluid loss control additive. To each of the drilling fluids various concentrations of TEAPE was added and neutralized to a pH of 7 with sodium hydroxide. Slurries were prepared as described in the test procedure, using 100 g of tar sand in each of the drilling fluids. Steel sleeves as were placed into aging cells, the slurry transferred into the aging cell and the samples placed in the roller oven for 60 hours, then the steel sleeves were removed and treated as described in the test procedure. Table 3 summarizes the tar sand accretion on the steel sleeves treated at various concentrations.

TABLE 3

| TEAPE Concentration (% of drilling fluid) | Tar Sand Accretion (g/m$^2$) |
|---|---|
| 0.47 | 0 |
| 0.32 | 67 |
| 0.16 | 29.6 |
| 0 | 140.5 |

This example demonstrates that the effectiveness of the phosphate ester is present but diminished at low concentrations.

The invention claimed is:

1. A method for drilling a wellbore through a tar sand-containing formation, the method comprising: operating a drilling assembly to drill a wellbore and circulating an aqueous-based drilling fluid through the wellbore as it is drilled, the aqueous-based drilling fluid including a tar sand anti-accretion additive including at least one of (i) a phosphonate and (ii) a phosphate ester of alkanolamine in an amount effective to limit tar sand accretion on metal surfaces.

2. A method for limiting accretion on metal surfaces in contact with tar sand-containing formation, the method comprising: washing the metal surfaces with an aqueous-based drilling fluid, the aqueous-based drilling fluid including an amount of at least one of (i) a phosphonate and (ii) a phosphate ester of alkanolamine.

3. A method for removing accretion from metal surfaces in contact with tar sand-containing formation, the method comprising: washing the metal surfaces with an aqueous-based drilling fluid, the aqueous-based drilling fluid including an amount of at least one of (i) a phosphonate and (ii) a phosphate ester of alkanolamine.

4. The method of claim 1 wherein the tar sand anti-accretion additive is present in the drilling fluid at a concentration of at least 0.1% by weight of the drilling fluid.

5. The method of claim 1 wherein the tar sand anti-accretion additive is neutralized to a pH of 7 to 10.

6. The method of claim 1 wherein the drilling fluid containing tar sand anti-accretion additive is circulated during drilling when tar sand drill cuttings are produced.

7. The method of claim 1 wherein the drilling fluid containing tar sand anti-accretion additive is circulated during drilling of a build section of the wellbore.

8. The method of claim 1 wherein the drilling fluid containing tar sand anti-accretion additive is circulated during drilling of a horizontal section of the wellbore.

9. The method of claim 1 where the phosphate ester is the mono and di phosphate ester of monoethanolamine.

10. The method of claim 1 where the phosphate ester is the mono and di phosphate ester of diethanolamine.

11. The method of claim 1 where the phosphate ester is the mono and di ester of triethanolamine.

12. The method of claim 1 where the phosphonate is ATMP.

13. The method of claim 1 where the phosphonate is HEDP.

14. The method of claim 1 where the phosphonate is EDTMPA.

15. The method of claim 1 where the phosphonate is DTPMPA.

16. The method of claim 1 where the phosphonate is BHMTPMPA.

17. The method of claim 2 wherein the step of washing is carried out by circulating the drilling fluid through the wellbore.

18. The method of claim 2 wherein the step of washing is carried out during drilling the wellbore.

19. The method of claim 2 wherein the step of washing is carried out during running a liner into the wellbore.

20. The method of claim 2 wherein the at least one of (i) a phosphonate and (ii) a phosphate ester of alkanolamine is present in the drilling fluid in an amount of at least 0.1% by weight of the drilling fluid.

21. The method of claim 2 wherein the at least one of (i) a phosphonate and (ii) a phosphate ester of alkanolamine is neutralized to a pH of 7 to 10.

22. The method of claim 3 wherein the step of washing is carried out during drilling the wellbore.

23. The method of claim 3 wherein the step of washing is carried out during running a liner into the wellbore.

24. The method of claim 3 wherein the at least one of (i) a phosphonate and (ii) a phosphate ester of alkanolamine is present in the drilling fluid in an amount of at least 0.1% by weight of the drilling fluid.

25. The method of claim 3 wherein the at least one of (i) a phosphonate and (ii) a phosphate ester of alkanolamine is neutralized to a pH of 7 to 10.

26. The method of claim 3 wherein the step of washing is carried out by circulating the drilling fluid through the wellbore.

* * * * *